United States Patent [19]

Nicolas

[11] Patent Number: 4,499,452

[45] Date of Patent: Feb. 12, 1985

[54] MODULATION INSTALLATION FOR SECTOR SUPPLY OF CHARGE ELEMENTS

[75] Inventor: Jean-Pierre Nicolas, Nice, France

[73] Assignee: Etablissements Augier, Carros, France

[21] Appl. No.: 317,489

[22] Filed: Nov. 2, 1981

[30] Foreign Application Priority Data

Nov. 3, 1980 [FR] France ................................ 80 23458

[51] Int. Cl.[3] ................................................ H04B 3/54

[52] U.S. Cl. ............................. 340/310 A; 340/310 R; 315/294; 315/DIG. 7

[58] Field of Search ........ 340/310 R, 310 A, 310 CP; 307/3, 140; 315/244, 294, 313, 258, 315, DIG. 7

[56] References Cited

U.S. PATENT DOCUMENTS 3,714,451 1/1973 Whitney et al. ................ 340/310 R
3,878,431 4/1975 Petrina ................................ 315/294
4,169,259 9/1979 Hidler et al. ..................... 340/310 R
4,190,790 2/1980 Plump et al. .................... 340/310 A
4,328,482 5/1982 Belcher et al. ................. 340/310 A

FOREIGN PATENT DOCUMENTS 2335119 7/1977 France .
2361688 3/1978 France .

*Primary Examiner*—James J. Groody
*Attorney, Agent, or Firm*—Fleit, Jacobson, Cohn & Price

[57] ABSTRACT

An installation for controlling the electric supply of charge elements, such as high pressure discharge lighting lamps, which are distributed along supply lines to which are applied an alternating supply voltage and periodical control transitions superposed to said alternating supply with a selected phase angle. The installation comprises supply circuits through which said charge elements are connected across supply lines. Said supply circuit includes a pulse transformer having two windings, one of the windings being connected via a capacitor in parallel to a choke coil. The other winding triggers a controlled switching device which supplies the charge elements.

13 Claims, 8 Drawing Figures

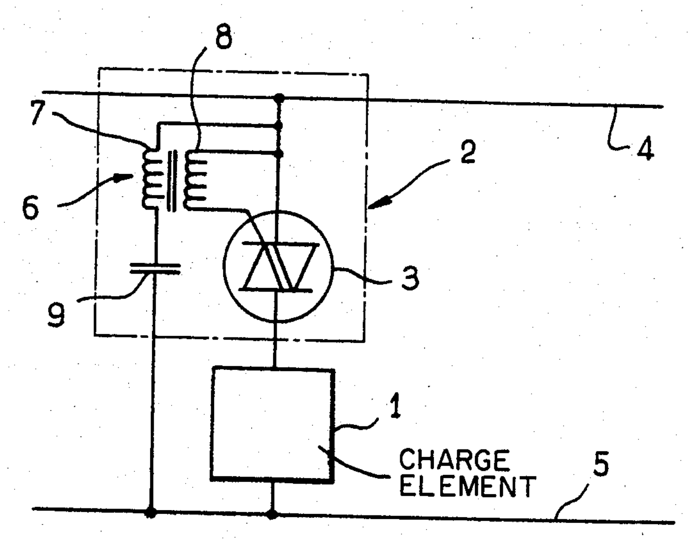
FIG_1
FIG_2
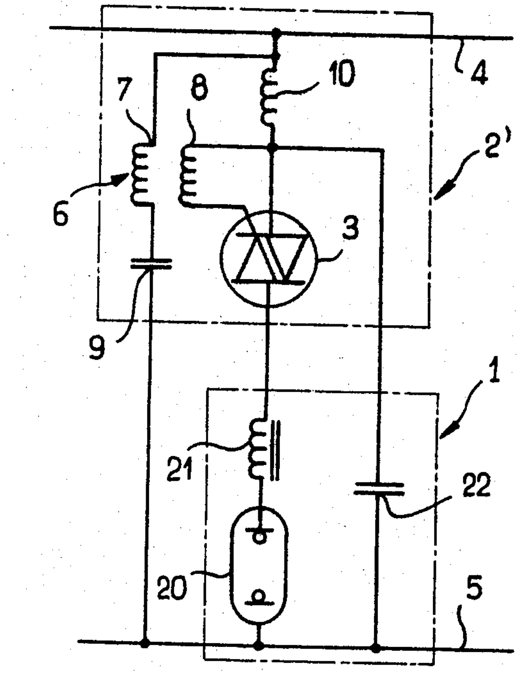
FIG_3
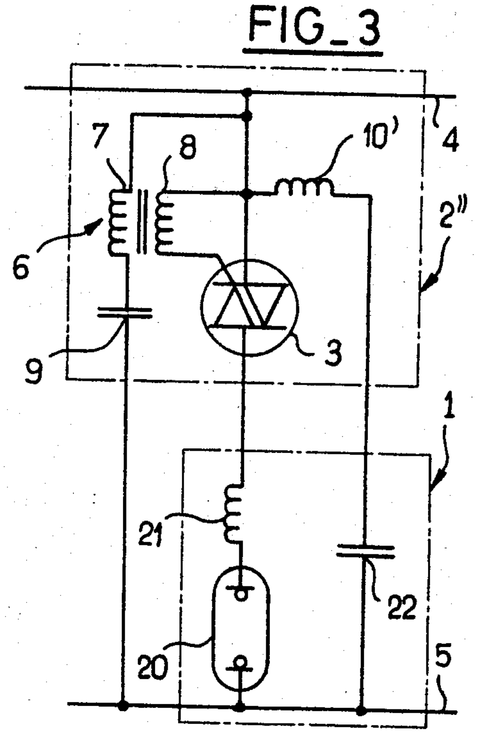
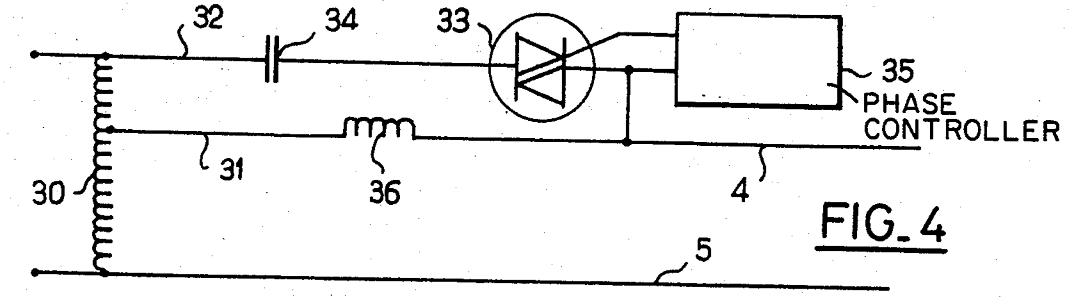
FIG_4

MODULATION INSTALLATION FOR SECTOR SUPPLY OF CHARGE ELEMENTS

DESCRIPTIVE SUMMARY

The invention relates to a modulation installation for the sector supply of charge elements which are geographically distributed.

The charge elements (1), of which it is desired to modulate the supply, are equipped with a circuit (2) which consists of a triac (3) which plays the part of a controlled interrupter which is suitable for varying their working power and a detector assembly consisting of a pulse transformer (6) which reacts to transitions superposed periodically on the alternating voltage of the sector with a selected phase angle on actuating the controlled interrupter (3) according to the phase angle defined by the transitions.

Application in particular to the supply to high pressure discharge lamps such as sodium and mercury vapour lamps.

The invention relates to a modulation installation for direct or indirect sector supply to power or charge elements which are geographically distributed and especially an installation for high pressure discharge lamps such as sodium or mercury vapour lamps.

The present power economy requirements require as much as possible the modulation of the supply of power elements such as, for example, high pressure discharge tubes used for public lighting. Such lamps are usually connected to the alternating sector network by means of a ballast inductance assembled in series with the lamp and by means of a capacitor whose purpose is to improve the power factor of the lampballast unit thus formed, to which it is assembled in parallel.

Simple solutions have been proposed for modulating the supply to these lamps, consisting, for example, of modulating the voltage of the supply line. Unfortunately, this solution only makes possible a power reduction of less than 30%; in fact the high pressure discharge lamps are extinguished when the value of the supply voltage available at the moment when the lamp starts up again is about the maximum instantaneous value of the arc voltage.

Other more elaborate solutions consist of introducing, in series on the supply line, inductances of suitably chosen values whose value is made to vary. This device operates satisfactorily but does not make it possible to modulate the power of only some of the elements selectively when it is situated in the central station of the sector, thus necessarily controlling all the elements connected downstream on the line. In so far, on the other hand, as such a device with variable inductances is arranged in series with each lamp of which it is desired to modulate the supply selectively, it was necessary up to now to provide the installation of additional conductors whose purpose was to control the increase of the values of the series inductances.

The present invention proposes an installation whose purpose is to modulate the supply of power elements which are geographically distributed on the sector supply lines, and especially high pressure discharge lamps, which would make it possible to control certain of the elements selectively without interfering with the function of the other elements.

The installation according to the invention makes it possible, moreover, to intervene easily and directly on the modulation, and thus to modify a possible preliminary programming of the modulation in order to take into account exceptional criteria such as, for example, in the case of high pressure discharge lamps, a lowering of the illumination due to poor atmospheric conditions.

The installation can, moreover, be easily connected to pre-existing lines without its being necessary to modify these in any way and without its being necessary in particular to have additional conducting cables available whose purpose is a selective supply of certain of the elements.

With this in view, according to the invention, at least some of the power or charge elements are equipped with a supply circuit which includes a controlled interrupter suitable for varying their working power, and a detector assembly which reacts to the appearance of a transition which is periodically superposed on the alternating voltage of the sector with a chosen phase angle, by actuating the interrupter which is controlled according to the phase angle defined by the transition.

According to an advantageous mode of execution, the controlled interrupter is a controlled rectifier device of the thyristor or triac type and the detector assembly includes a pulse transformer which controls the controlled rectifier device.

According to one particular method of execution, the controlled interrupter of the thyristor or triac type is connected in series with a ballast inductance which, with a capacitor whose purpose is to improve the power factor, forms the conventional supply circuit of high pressure discharge illumination lamps, the said capacitor being connected in parallel with the unit composed of the lamp-ballast-controlled interrupter series, and the circuit thus formed is connected to the supply lines by means of an element such as a choke coil which has a high impedance, with regard to the high frequency components of the transitions.

According to a particular characteristic of the present invention, the detector assembly consists of a pulse transformer of which one winding is connected, by means of a capacitor, to the terminals of a choke coil, the said winding comprising, in relation to the impedance of the choke coil, a high impedance at the nominal frequency fo the supply sector, and a low impedance for the high frequency components of the transitions; the controlled interrupter and the power element are connected to the supply lines by means of the circuit formed in this manner.

According to an advantageous characteristic of the present invention, at least one pulse transformer is provided which couples a transition generator to the supply lines of the power elements in order to superpose the transition on to the sector supply voltage.

Hence the transition can be either formed from a single pulse superposed on the sector voltage according to a selected phase angle, or formed from an alternating signal of high frequency in relation to the nominal frequency of the sector supply, said alternating signal being superposed on the sector voltage with a phase angle selected in such a manner that a train of high frequency pulses is superposed on the sector supply voltage of each alternation of the latter.

This latter solution makes it possible to eliminate, in a simple manner, the problems of extinguishing of discharge lamps which could take place if the control pulse was supplied on the gate of the triac before the current is re-inverted and consequently before the lamp is liable to switch on again (the current and the voltage being dephased owing to the self-inductive nature of the load).

Other characteristics and advantages of the present invention will appear on reading the detailed description which follows and on taking into account the attached drawings, given as non limiting examples, in which:

FIG. 1 shows the electrical circuit of one example of execution of a circuit formed of a controlled interrupter and a detector assembly according to one mode of the invention;

FIG. 2 represents the electrical arrangement of a circuit whose purpose is in particular the supply of high pressure discharge lamps;

FIG. 3 shows the electrical circuit of one variant of execution of a circuit whose purpose is the supply of high pressure discharge lamps;

FIG. 4 represents the electrical arrangement of a circuit which generates the transitions which are superposed on the alternating voltage of the sector;

Figure 6:
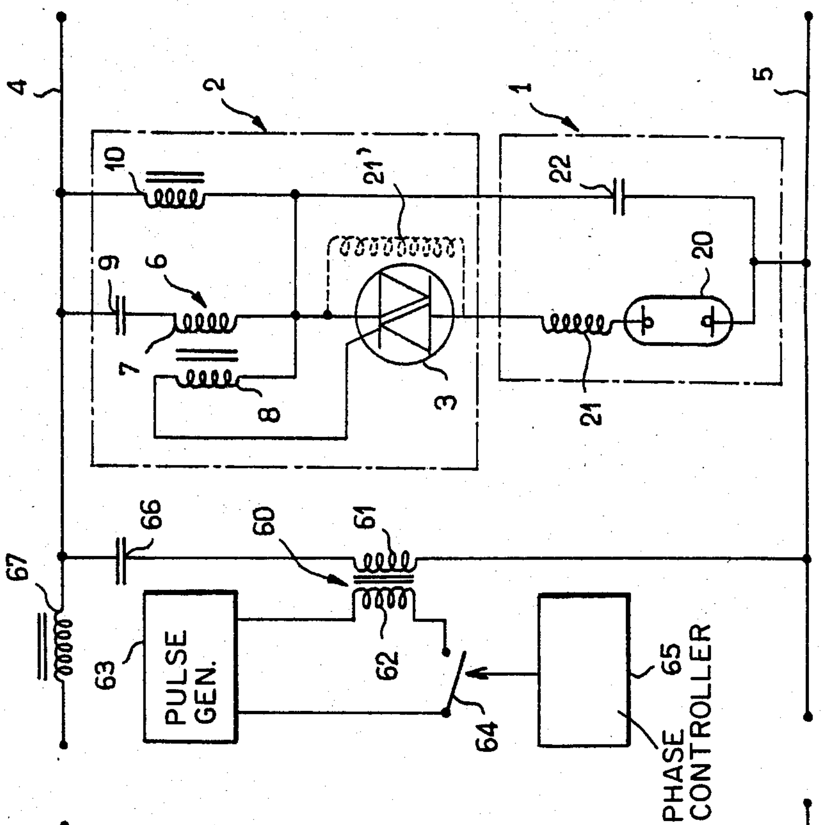
FIGS. 5–8 represent four variants of execution of modulation installations in accordance with the present invention.

According to the invention, each power or charge element 1 (by power or charge element 1 we understand henceforth equally any power control element itself) of which it is desired to modulate the supply, is equipped with a supply circuit 2 which consists in particular of a controlled interrupter 3, such as a triac according to the advantageous method of execution shown in FIG. 1, by means of which the power or charge element 1 is connected to the sector supply lines 4,5. It must, however, be understood that the invention covers also variants of execution in which the triac is replaced by any similar device such as in particular a unit of two thyristors assembled "head to tail".

According to the method of execution shown in FIG. 1, each circuit 2 is complemented additionally by a pulse transformer 6, of which one of the windings 7 is connected between the two sector supply lines 4, 5 by means of a capacitor 9, which has a high impedance for the sector supply nominal frequency in relation to the load and a low impedance for the high frequency components of transitions superposed periodically on the alternating voltage of the sector. This capacitor 9 hence avoids the short circuiting of the sector supply voltage of the derivation branch formed by the winding 7. The second winding 8 of the pulse transformer connects one of the supply lines 4 and the control gate or electrode of the triac 3. The transformer 6 thus makes it possible to obtain a galvanic isolation between the control circuit of the triac and the sector supply.

On reading the above description it is easily understood that the pulse transformer which detects the transitions superposed on the alternating sector voltage controls the triggering, that is, the conduction of the triac according to the phase angle defined by the transition. The modulation of the supply of the power elements is hence easily obtained by modulation of the phase angle of the transitions superposed on the alternating voltage of the sector.

The invention applies particularly to the supply of high pressure discharge lamps 20, such as those shown in FIG. 2. Such lamps, especially sodium or mercury vapour lamps, are usually connected to the alternating sector network by means of a ballast inductance 21 assembled in series with the lamp and by means of a capacitor 22 whose purpose is to improve the power factor of the lamp-ballast unit thus formed, with which it is usually connected in parallel.

The high pressure discharge lamps 20 complemented by a ballast inductance 21 and a capacitance 22 form a power element 1 which is similar to that shown in FIG. 1 and which can hence be supplied by a circuit 2' which is approximately identical to the circuit 2 described above. This circuit 2' consists in fact of a triac 3, a pulse transformer 6, and a capacitor 9; however, in the method of execution shown in FIG. 2 the capacitor 22 is not connected in parallel with the unit formed by the lamp 20-ballast inductance 21, but in parallel with the unit formed by the series lamp 20-ballast inductance 21-triac 3. On the other hand, the circuit thus formed is connected to the supply lines by means of an element 10 which has a high impedance in relation to the high frequency components of the transition, in order to avoid the capacitor 22 short-circuiting the said high frequency components of the transitions. This element 10 is preferably formed of a choke coil as shown in FIG. 2.

In the execution variant shown in FIG. 3, whose purpose is likewise the supply to high pressure discharge lamps, we find the power element 1 made up of a lamp 30, a ballast inductance 21 and a capacitor 22.

Moreover, we find in the supply circuit 2'', the triac 3, the pulse transformer 6, the capacitor 9 and the choke coil, the latter 10', however, in this variant of execution, being series connected with the capacitor 22, it thus plays the same part as in the mode of execution of FIG. 2, that is, avoiding the short circuiting of the high frequency components of the transitions, by this capacitor 22.

FIG. 4 shows the electrical arrangement of the circuit which generates the transitions. Such a device is arranged at the central stations of the sector in such a manner as to superpose transitions periodically on the alternating voltage of the sector.

The circuit consists of an autotransformer or a transformer with two windings 30 provided with two tappings on its secondary winding, one 31 at the nominal value of the sector voltage, the other 32 at a value which is about 20 volts higher. The tapping with higher value 32 is connected to the downstream line through a capacitor 34 and a controlled interrupter 33, such as a triac. This interrupter is controlled according to a phase angle selected by means of a conventional phase control circuit 35.

The conduction of the triac 33 makes it possible to obtain the rapid charge of the capacitor 34 according to a phase angle which is variable between 0 and $\pi$ chosen by means of the phase command 35 and to superpose the pulse thus formed on the alternating voltage of the sector. A resistor, which is not shown, may be provided in parallel with the capacitor 34 in order to ensure the discharge of the latter at the beginning of operation.

The nominal value tapping 31, is, for its own part, connected to the downstream line 4 by means of an element which is not permeable to transitions, such as a choke coil 36 in order to avoid the short circuiting of the pulses produced by the coiling of the transformer which is included between the two tappings 31 and 32.

We will now describe the variants of the method of execution shown in FIGS. 5–8.

Figure 5:
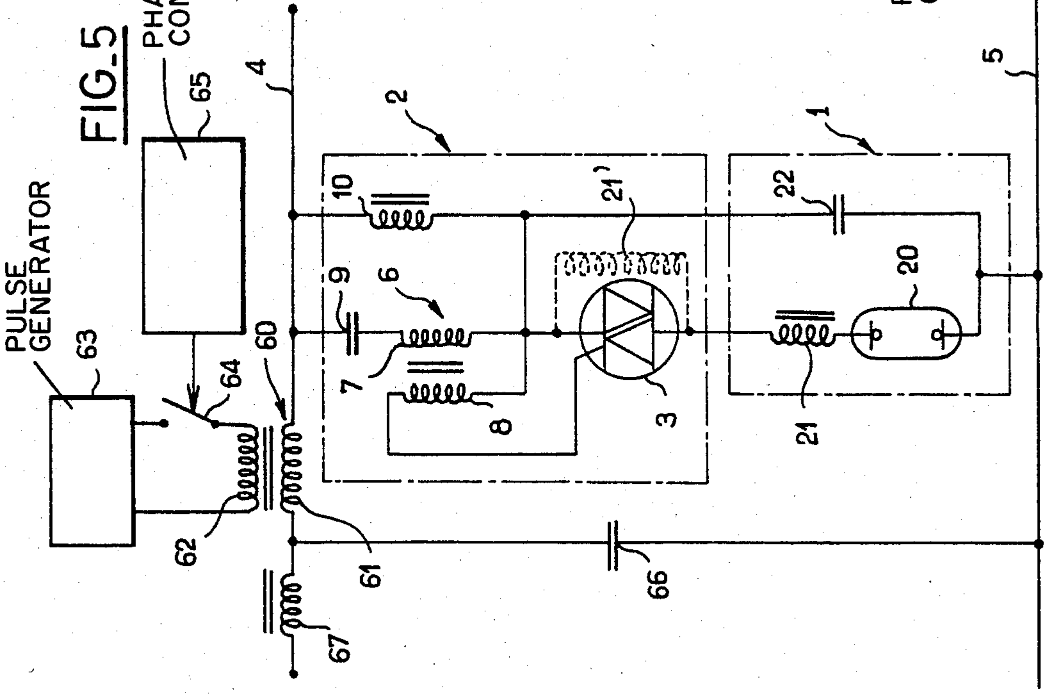

As is shown in FIG. 5, the supply circuit 2 consists of a detector assembly formed of a pulse transformer 6 of which one winding 7 is connected by means of a capacitor 9 to the terminals of a choke coil 10. The value of the capacitor 9 is determined in such a manner that the series branch formed by this capacitor 9 and the said winding 7 of the pulse transformer 6 forms, in relation to the impedance of the choke coil 10, a high impedance, at the sector supply nominal voltage and a low impedance for the high frequency of the transitions. The controlled interrupter 3 and the power element 1 are connected to the supply lines 4 and 5 by means of the circuit formed in this manner. The second winding 8 of the pulse transformer 6 connects the anode 1 of the triac 3 with the gate of the latter.

Hence the choke coil 10 allows the sector nominal supply frequency to pass and blocks the high frequency components of the transitions, whilst the capacitor 9 blocks the nominal frequency of the sector supply and allows the high frequency components of the transitions to pass.

In relation to the installations described in connecting with FIGS. 1-3, in which the detector assembly, made up of the capacitor 9 and the pulse transformer 6, was branched in parallel on the supply lines 4 and 5, it is understood that the capacitor 9 no longer has need to hold a voltage close to the sector voltage, for example 220 volts, but simply the amplitude of the transition superposed on the alternating voltage of the sector, that is, an amplitude with a maximum of 20 volts. Moreover, since the capacitor 9 is branched approximately parallel to the choke coil 10, it is understood that the latter can assume values which are appreciably higher than in the installations described in the main patent.

Moreover, as is shown in FIG. 5, a device 63 which is a transition generator, is coupled to the supply lines 4, 5 of the power or charge elements 1 by means of a pulse transformer 60 of which one winding 61 is series connected to one (4) of the lines. The second winding 62 is connected with the output of the said generator, by means of an interrupter 64 which is controlled by a device 65, preferably of the phase control type.

In order to avoid the problems of extinguishing which are liable to be encountered with the installations shown in FIG. 4, it is found to be advantageous if the transitions generator 63 does not deliver a series of pulses on the basis of only a pulse for each alternation of the sector supply voltage, but a series of pulse trains on the basis of pulse trains by alternation. Hence the transition is formed from a high frequency alternating signal in relation to the sector nominal supply frequency (for example, of the order of 20 to 50 kHz), said signal being superposed on the sector voltage with a selected phase angle. In this case the generator 63 consists of an oscillator, and the closing of the interrupter 64 actuated by the device 65 with phase control, determines the beginning and hence the phase of the pulse train.

It is understood that even if the first arrives on the pulse transformer 6 before the reinversion of the current authorises the conduction of the lamp 20, the first pulse which will be subsequent to this reinversion of the current will cause the conduction of the triac 3 and the lamp 20. This arrangement forms, as it were, a safety for conduction.

Moreover, there is provided, on the side of the central station of the sector, in relation to the winding 61 of the pulse transformer 60, and in series on the line 4 which receives the latter, an element 67, such as a choke coil, which presents a high impedance in relation to the high frequency components of the transitions, in relation to the load impedance, and a low impedance with regard to the nominal sector supply frequency, and on the other hand in parallel between each phase and the neutral (4, 5) a capacitor 66 consisting of a high impedance at the nominal sector supply frequency in relation to the load impedance and a low impedance for the high frequency components of the transitions.

The purpose of the choke coil 67 is to avoid the pulses of the transition generator 63 being directed towards the central stations of the sector, whilst the purpose of the capacitor 66 is to form a closed circuit for these pulses whilst avoiding short circuiting the sector voltage.

it is of course understood that by closing of an interrupter 64 under the influence of the control of the device 65, the generator 63 superposes a transition by means of the pulse transformer 60, on the sector supply voltage. The transition is blocked by the choke coil 10 of the supply circuit 2, but passes through the capacitor 9 and the capacitor 22 which is provided in parallel with the unit lamp 20-ballast inductance 21-triac 3, this transition is hence found again at the terminals of the first winding 7 of the pulse transformer 6 and makes it possible to control the conduction of the triac 3 by applying a pulse or a series of pulses on the gate of the triac.

Thus by modulating the phase angle of the pulse or of the pulse train superposed on the sector supply voltage by means of the device 65, it is easy to modulate the phase angle of the conduction of the triac 3 and thereby the supply of the power elements 1 which are connected in series with these. According to a first method of execution, the winding 61 of the pulse transformer 60 is provided in series on the phase line 4 of the sector and a pulse generator 63 and phase control device 65 are provided for each of the phases of the network. It is then easy to synchronise the device 5 for phase control on each of the phases under consideration.

It is likewise possible to provide the winding 61 of the pulse transformer 60 on the neutral of the network; this arrangement has the advantage of only requiring a single pulse generator 63 and a single phase control device 65. However, in this case, it is found to be quite tricky, on the basis of dephasing of $2\pi/3$ between each phase of the sector, to control selectively by a single transition, the power elements connected on one of the said phases without accidentally interfering with the control of the power elements connected on the other phases. In this case it is hence preferred to use a generator 63 controlled on the basis of "all or nothing" which produces pulse trains as has been previously described.

FIG. 6 shows a variant of execution of the installation in accordance with the present invention, using power elements 1 and supply circuits 2 connected in series between the supply lines 4, and 5, which are strictly identical to the corresponding devices which have been describes in connection with FIG. 5

However, according to the variant of FIG. 6 the winding 61 of the pulse transformer 60 is not connected in series on one of the supply lines 4 or 5, but in parallel between these two lines, by means of the above-mentioned capacitor 66. For the rest, the transition generator 63, the second winding 62, the interrupter 64 and the phase command device 65 are in all points identical to those described in connection with FIG. 5. The same applies to the choke coil 67 which is connected on the side of the central station of the sector in relation to the device which generates the transition.

The functioning of the installation represented in FIG. 6 is hence completely comparable with that of the installation of FIG. 5. There again it is understood that the modulation of the supply of the power elements is easily obtained by modulation of the phase angle of the transitions superposed on the alternating voltage of the sector. Of course, in such a case, it is likewise necessary to provide a device which generates transitions 63 and a phase command device 65 for each of the phases of the network.

According to another variant of execution in accordance with the present invention, it is possible to provide a ballast inductance which is reactive in two elements 21, 21' in series with each lamp 20, one of the elements (21') being liable to be short-circuited by the controlled interrupter 3 at the time of the conduction of the latter. Hence an auxiliary element 21' of the ballast inductance has been shown in dotted lines on FIGS. 5 and 6, parallel to the triac 3. In the non-conducting state of the triac 3, the lamp 20 is supplied by means of this auxiliary element 21'; by closing the interrupteur 64, the generator of transitions 63 produces a pulse or a pulse train which is superposed on the sector supply voltage, causing the conduction of the triac 3, which hence short-circuits the said auxiliary element 21' of the ballast. Of course, the effect of this is to switch over the supply power of the power element 1. Here again, by modulation of the phase of the transition by means of the device 65, it is easy to modulate the supply power of the lamp.

Figure 7:
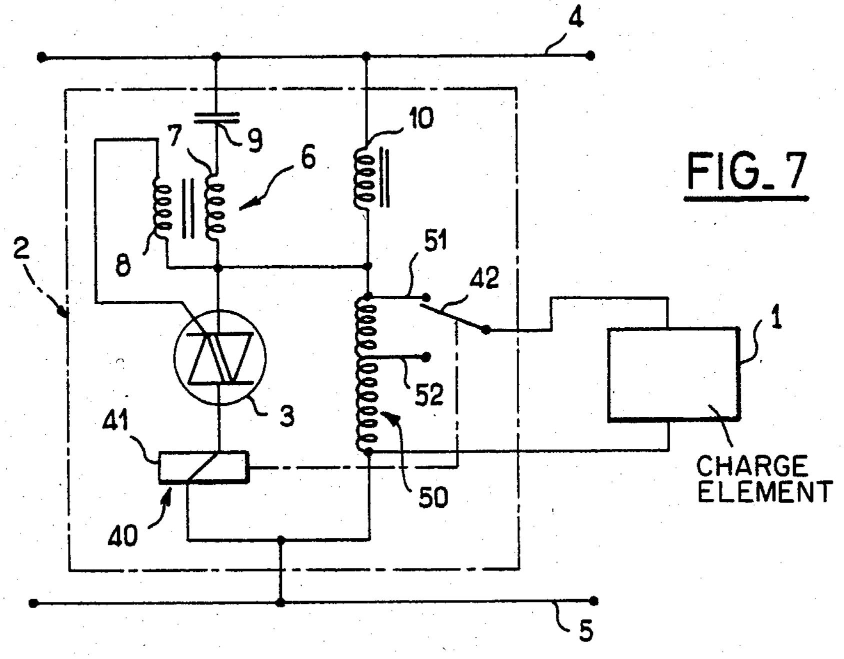
Figure 8:
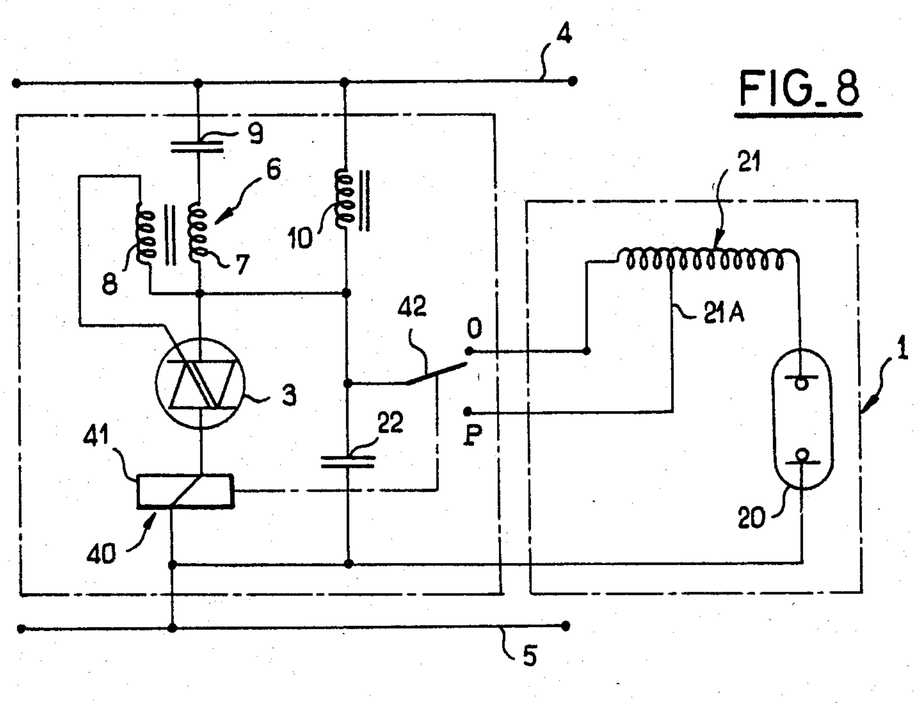

FIGS. 7 and 8 shows two installations variants which are compatible with the devices which generate transitions previously described, but in which the controlled interrupter is formed in combination with an electromagnetic relay 40 and a semiconductor device 3 of the thyristor or triac type, the coil 41 of the relay being series connected from the semiconductor device 3.

In FIGS. 7 and 8 we find again the detector assembly which reacts to the appearance of the transition by actuating the controlled interrupter 3 according to the phase angle defined by the transition, which has been defined in connection with FIGS. 5 and 6 and which includes the capacitor 9 and the pulse transformer 6, with two windings 7 and 8, of which one of the windings 8 is connected between one of the anodes and the gate of the triac 3, whilst the other winding 7 is branched by means of the capacitor 9, parallel with the choke coil 10.

As is shown in FIG. 7 an autotransformer 50 with a secondary winding with two tappings 61 and 62 is also provided. The contact element 42 of the electromagnetic relay 40 makes it possible to switch over the supply of the power or charge element 1 on to one or the other of the tappings 51 and 52 in such a manner as to vary the supply voltage of the power or charge elements 1 and hence the supply power of the latter.

Here again the controlled interrupter 3 and the power element 1 are connected to the lines 4 and 5 of the sector by means of the circuit formed by the choke coil 10, parallel with the pulse transformer 6 and the capacity 9.

The installation shown in FIG. 8 concerns more especially the supply of the high pressure discharge lamps 20, for which an inductance ballast 21 is provided in series and, in parallel, a capacitor 22 which improves the power factor of the whole unit.

According to the method of execution shown in FIG. 8, the ballast inductance 21 is of the type with an auxiliary connector 21A.

The control of the contact element 42 of the electromagnetic relay 40 makes it possible, to connect the lamp 20 between the supply lines 4 and 5 of the sector, either by means of the whole of the ballast inductance 21 when the contact 42 is in position O, or by means of only one portion of the inductance ballast 21 when the contact 42 is in position P and thus to switch the power of the lamp 20.

It is understood on reading the above description that the installation can be rapidly and easily installed on the already existing supply lines by adding to the central stations the suitable pulse generator device and to each power or charge element of which it is desired to modulate the supply, the circuit 2 according to the selected execution variant.

Generally speaking, the invention is not limited to the examples of execution described and shown above, from which it will be possible to foresee other forms and other methods of execution, without, however, going outside the framework of the invention. For example, it will easily be possible to replace the triac 33 of the circuit which generates the pulse by any similar device, such as a unit formed of two thyristors assembled "head to tail".

On the other hand, as has already been defined, the power or charge element 1 can consist of a power or charge element as such, or of an intermediate power element; that is, the latter could consist, for example, of a relay supplied with alternating current, of a diode bridge with a relay supplied in direct current, a diode bridge with a filter supplying a direct voltage for the control of power or charge element properly so called, such as triacs, thyristors, magnetic amplifier or any other similar device.

Similarly it is known that in order to avoid the stopping of a triac (or thyristor) connected to a self-inductive load it is necessary to maintain control on the gate of the latter. Such an arrangement will be easily achieved, for example, by means of an auxiliary triac or thyristor whose anodes are connected to the anode 2 and to the gate of the main triac respectively, the auxiliary triac or thyristor, operating for its part, on an ohmic charge.

It is moreover, useful to note that the arrangement of FIG. 7 assumes that there is a capacitance connecting the detector device to the neutral line of the sector.

I claim:

1. An installation for controlling the electric supply of charge elements which are distributed along supply lines in response to periodical control transitions superposed, at a selected phase angle, upon an alternating supply voltage supplied across said supply lines, said installation comprising supply circuits through which each of said charge elements is connected between first and second supply lines, each supply circuit including:

a transition detector means comprising;

a pulse transformer having two windings, a capacitor connected in series with one of the two windings to form a series assembly, a choke coil connected in parallel with said series assembly, means for coupling said series assembly between said supply lines, and a controlled switching device connected in series with the charge element, via the series assembly, across said supply lines, said controlled switching device having a trigger circuit comprising the other of the two windings, wherein said capacitor and said one winding connected in series to form the series assembly offer a high impedance, at the alternating supply voltage frequency in relation to said choke coil, and said capacitor and said one winding connected in series offer a low impedance in relation to the choke coil for the periodical control transitions, whereby the conduction of said controlled switching device and the supply of the charge element occur upon detection of transitions by said pulse transformer.

2. An installation for controlling the electric supply of charge elements which are distributed along supply lines in response to periodical control transitions superposed at a selected phase angle upon an alternating supply voltage supplied across said supply lines, said installation comprising supply circuits through which each of said charge elements is connected between first and second supply lines, each supply circuit including a controlled switching device having a main conduction path defined between two main electrodes and an auxiliary control electrode for controlling conductance between said two main electrodes, one of the two main electrodes being connected to one side of said charge element, while the other side of said charge element is connected to the first supply line, transition detector means including:

a capacitor and a pulse transformer having two windings, one of the two windings being connected in series with said capacitor between the second supply line and the other main electrode of said controlled switching device, the other of the two windings being connected between said auxiliary control electrode and said other main electrode of said controlled switching device, a choke coil connected between said second supply line and said other main electrode of the controlled switching device, and means for coupling said other main electrode to the first supply line wherein said capacitor and said one winding connected in series offer a high impedance, at the alternating supply voltage frequency in relation to said choke coil, and said capacitor and said one winding connected in series offer a low impedance in relation to the choke coil for the periodical control transitions, whereby the conduction of said controlled switching device and the supply of the charge element occur upon detection of transitions by said pulse transformer.

3. An installation according to claim 2 wherein the controlled switching device comprises a semiconductor device.

4. An installation according to claim 2 wherein the charge element is an electromagnetic relay.

5. An installation according to claim 2 wherein the charge element comprises a high pressure discharge lighting lamp.

6. An installation according to claim 5 wherein the charge element comprises a high pressure discharge lighting lamp and a ballast inductance connected in series between said first supply line and said one of the two main electrodes of the controlled switching device, and said means for coupling comprises a capacitor which connects said first supply line to said other main electrode of the controlled switching device.

7. An installation according to claim 6 wherein an auxiliary reactive ballast is connected across the two main electrodes of said controlled switching device (3).

8. An installation according to claim 4 wherein said other of the two main electrodes of the controlled switching device is coupled to said first supply line by an autotransformer (50) comprising at least two output tappings, said electromagnetic relay being adapted to connect a load between said first supply line and one or the other of said output tappings.

9. An installation according to claim 2 wherein said coupling means comprises a capacitor coupling said other of the two main electrodes of the controlled switching device to said first supply line.

10. An installation according to claim 9 wherein the charge element is an electromagnetic relay adapted to connect, in series with a high pressure discharge lighting lamp, at least part of a reactive ballast having a median connector, between said other of the two main electrodes of the controlled switching device and the first supply line.

11. An installation according to claim 1 wherein the transitions are formed of a single pulse superposed on each alternation of the alternating supply voltage, according to a selected phase angle supplied across said supply lines.

12. An installation according to claim 1 wherein the transitions consist of a high frequency alternating signal in relation to the alternating supply voltage frequency, said signal being superposed on the alternating supply voltage across said supply lines with a phase angle selected in such a manner that a high frequency pulse train in superposed on the alternating supply voltage at each alternation of the latter.

13. An installation for controlling the electric supply of charge elements which are distributed along supply lines in response to periodical control transitions superposed at a selected phase angle upon an alternating supply voltage supplied across said supply lines, said installation comprising supply circuits through which each of said charge elements is connected between a first and a second (4) supply line, said supply circuits having two main input terminals and an auxiliary input terminal, each charge element being connected between said first supply line and one of the two main input terminals of the supply circuit, and the auxiliary input terminal being connected to said first supply line, while the other main input terminal is connected to said second supply line, each supply circuit including;

a controlled switching device having a main conduction path defined between two main electrodes and an auxiliary control electrode, for controlling conductance between said two main electrodes, one of the two main electrodes being connected to said one main input terminal of the supply circuit, transition detector means having two main terminals and an auxiliary control terminal, one of the two main terminals of the transition detector means being connected to the other main input terminal of the supply circuit, while said other of the two main terminals of the transition detector means is connected to said other of the two main electrodes of the controlled switching device and the auxiliary control terminal of the transition detector means is connected to the auxiliary control electrode of said controlled switching device, said transition detector means including:

a capacitor, and a pulse transformer having two windings, one of the two windings being connected in series with said capacitor between said two main terminals of said transition detector means, and the other of the two windings being connected between said auxiliary control terminal and said other of said two main terminals of the transition detector means, a choke coil connected to said main terminals of transition detector means, and means for coupling said other main terminal of said transition detector means to said auxiliary input terminal of said supply circuit wherein said capacitor and said one winding connected in series offer a high impedance at the alternating supply voltage frequency in relation to said choke coil, and said capacitor and said one winding connected in series offer a low impedance in relation to the choke coil for the periodical control transitions, whereby the conduction of said controlled switching device and the supply of the charge element occur upon detection of transitions by said pulse transformer.

* * * * *